(12) United States Patent
Landau et al.

(10) Patent No.: US 7,570,262 B2
(45) Date of Patent: Aug. 4, 2009

(54) METHOD AND SYSTEM FOR DISPLAYING TIME-SERIES DATA AND CORRELATED EVENTS DERIVED FROM TEXT MINING

(75) Inventors: David Landau, Rehovot (IL); Ronen Feldman, Petach Tikva (IL); Orly Lipshatz, Bet-Shemesh (IL); Yonatan Aumann, Jerusalem (IL); Hadar Shemtov, Palo Alto, CA (US)

(73) Assignee: Reuters Limited, London (GB)

( * ) Notice: Subject to any disclaimer, the term of this patent is extended or adjusted under 35 U.S.C. 154(b) by 147 days.

(21) Appl. No.: 10/214,526

(22) Filed: Aug. 8, 2002

(65) Prior Publication Data
US 2004/0027349 A1 Feb. 12, 2004

(51) Int. Cl.
*G06T 11/20* (2006.01)
(52) U.S. Cl. .................. 345/440; 345/440.1; 345/440.2
(58) Field of Classification Search ................ 345/440, 345/440.1, 440.2, 35
See application file for complete search history.

(56) References Cited

U.S. PATENT DOCUMENTS

| | | | | |
|---|---|---|---|---|
| 5,412,769 A | * | 5/1995 | Maruoka et al. | 345/440 |
| 5,581,678 A | * | 12/1996 | Kahn | 345/440 |
| 5,986,673 A | * | 11/1999 | Martz | 345/649 |
| 6,222,540 B1 | * | 4/2001 | Sacerdoti | 345/581 |
| 6,429,868 B1 | * | 8/2002 | Dehner et al. | 345/440 |
| 6,473,084 B1 | * | 10/2002 | Phillips et al. | 345/440 |
| 6,965,900 B2 | * | 11/2005 | Srinivasa et al. | 707/102 |

* cited by examiner

*Primary Examiner*—Matthew C Bella
*Assistant Examiner*—Mike Rahmjoo
(74) *Attorney, Agent, or Firm*—Banner & Witcoff, Ltd.

(57) ABSTRACT

The present invention is directed to a method and system for correlating time-series data with events derived from text mining. The system is configured to receive a time period and a parameter concerning an entity, retrieve an event which is related to the entity and occurred within the time period from events which are previously extracted automatically from unstructured text, and display an indication of the event superimposed on a display representing the time series of the parameter for the time period.

25 Claims, 8 Drawing Sheets

METHOD AND SYSTEM FOR DISPLAYING TIME-SERIES DATA AND CORRELATED EVENTS DERIVED FROM TEXT MINING

FIELD OF THE INVENTION

The present invention generally relates to a method and system for displaying time-series data and correlated events. More specifically, the present invention relates to a method and system for displaying time-series data and correlated events derived from text mining.

BACKGROUND OF THE INVENTION

Numerical serial data, such as the prices of stocks on any given date, is commonly presented graphically on a chart. For example, financial serial data is commonly presented in the form of time-series data, where the X axis stands for time and the Y axis stands for the financial data, such as stock price, volume of transactions, degree of change, or other values pertaining to stocks. Looking at such a chart, one may see the changes in the stock price as they occur over time and observe trends and patterns. Plotting more than one such series of numerical data on the same graph, one may also compare one stock to another stock or an index representing an aggregated behavior of a number of stocks.

Many factors determine a stock price, but the common graphical representation only depicts the price as a function of time. It does not characterize any of the factors that could have brought about the changes in the stock price.

For example, consider the stock price of a drug company on the day it announces successful clinical trials of a new drug it has been developing. This "event" in the life of the company whose stock is under consideration may explain a rise in the price of the company's stock on that particular date. Similarly, when two companies announce a merger, each of their stock prices are affected. Also, when a key executive resigns from a company, the company's stock price may be affected.

Techniques have been developed to associate events to stock prices. For example, U.S. Pat. No. 5,412,769 to Maruoka et al. discloses a method and system for retrieving time-series information. When a user enters a desired time point, news and event occurrences are retrieved from an event database and displayed on a designated area on a graph of the retrieved time-series information. However, the step of extracting events is not disclosed. The news and event information is classified by class. Trade price is the time-series information.

U.S. Pat. No. 6,041,331 to Weiner et al. discloses a category based information extraction and graphic visualization system and method. The invention extracts information from a plurality of documents for display according to a set of pre-defined categories. Subsequently, a visual representation of the extracted information is provided for users. However, the disclosure is limited, among other things, by its failure to teach or suggest text mining based extraction of events.

U.S. Pat. No. 5,414,838 to Kolton et al. discloses a computerized data retrieval system for extracting historical market information. A user forms a search query and a database search engine finds results. The results are formatted in both textual and graphic reports. The system can include domain knowledge in a query, including calendar releases, national holiday, political elections, earnings report release, etc. However, the disclosure is limited, among other things, by its failure to teach or suggest extraction of events from sources outside the database.

The contents of aforementioned U.S. Pat. Nos. 5,412,769, 6,041,331, and 5,414,838 are incorporated by reference to the extent necessary to understand the present invention.

SUMMARY OF THE INVENTION

In one aspect, the present invention is directed to a system for correlating time-series data with events derived from text mining. The system comprises an application server program recorded in an electronic memory and configured to: (1) receive data indicating a time period and a parameter, the parameter concerning an entity, (2) retrieve event information previously extracted automatically from unstructured text, the event relating to the entity within the time period, and (3) display an indication of the event superimposed on a display representing a time-series of the parameter for the time period.

In this system, the application server program may be further configured to retrieve data corresponding to the parameter within the time period. The system may further comprise a quantitative data repository for the application server program to retrieve the parameter. The quantitative data repository may be a database or a connection to an external source.

In this system, the application server program may be further configured to receive an event type and retrieve event information corresponding to the event type.

The system preferably further comprises a knowledge base for storing a plurality of events extracted automatically from unstructured text. The system also preferably further comprises a text analysis engine configured to automatically extract a plurality of events from unstructured text. Accordingly, the system preferably further comprise a text receiver configured to receive unstructured text. The unstructured text may be, for example, a news article, a document, or a combination thereof. The text analysis engine may be further configured to associate each of the plurality of the events with a time or time interval.

In this system, the entity may be a company which issues equity securities (stock) and the parameter may be the price of the securities. The event may be an activity of the company, a competitor of the company, or a partner of the company. The event may be a merger, an acquisition, a product introduction, a management change, or an earnings warning.

In this system, the application server program may be further configured to correlate the parameter and the event. Also, the indication of the event may be an interactive icon and the application server program may be further configured to receive a request indicating an activation of the icon, and to retrieve information concerning the event upon receiving the request, the information derived from the unstructured text, and to and display the information.

BRIEF DESCRIPTION OF THE DRAWINGS

The present invention is described in detail below with reference to the drawings in which.

DETAILED DESCRIPTION OF PREFERRED EMBODIMENTS

Figure 1:
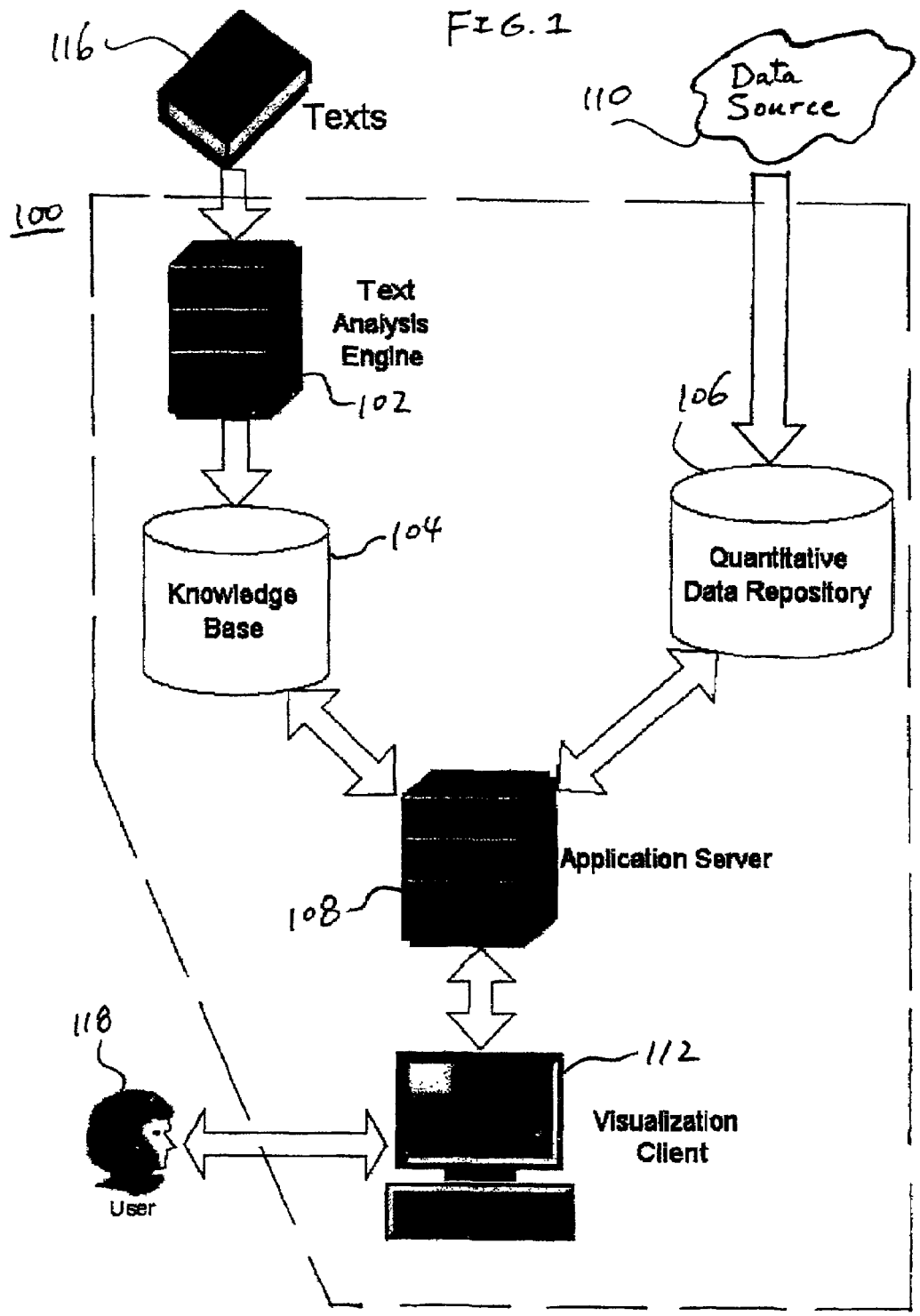
FIG. 1 is a block diagram of a correlating system according to one embodiment of the present invention.

FIG. 1 is a block diagram of a correlating system according to one embodiment of the present invention. The correlating system is for displaying time-series data, preferably in the form of trend graphs, and correlated events derived from text mining. In addition to representing a numerical sequence as it corresponds to time, the correlating system also provides explanatory power by plotting on a graph icons representing key events associated with the numerical sequence and showing the correlation between the occurrence of such events and the numerical sequence as the numerical sequence evolves over time. As shown in FIG. 1, the correlating system 100 comprises a text analysis engine 102, a knowledge base 104, a quantitative data depository 106, an application server 108, and a visualization client 112. The correlating system 100 is configured to receive and process to texts 116 and may be used by a user 118.

Texts 116 are unstructured text documents, such as news articles, reports, magazines, books. "Unstructured text" as used in this document means any text that is not fully disambiguated, whether partly structured or included within a larger, structured document. In an application concerning stock prices, the textual documents also preferably include SEC filings. Preferably, the textual documents are ASCII or Unicode text. The textual documents also preferably have titles and dates available.

The text analysis engine 102 receives texts 116. Text analysis engine 102 is preferably a processor configured to analyze the text and extract events related to one or more time series.

The one or more time series are serial numerical data, such as stock prices, stock indices weather data, or actuarial data. The events are preferably events that are believed to affect the evolution of the time series. In the case of stock prices, the events preferably include business activities, such as mergers, acquisitions, product introductions, management changes, and earning warnings, of different companies. For a stock price of a company, the events can be business activities of the company. For example, a drug company's announcement of successful clinical trials of a new drug is an event that affects the company's stock price.

The events can also be business activities of entities other than the company whose stock price is represented by the data, if the business activities are believed to affect the price of the stock. For example, the events may include occurrences in the industry or a sector of the industry to which the company belongs, such as business activities of the company's competitors or partners. It is often the case that a stock price of one company will be affected by events occurring to another company. For example, if a prominent chip-making company announces that it will not meet a certain target, analysts may interpret this as a sign of weakness pertaining to the whole chip-making industry. Similarly, when increased demand is described with relation to one player in an industry, it is likely that other players, perhaps too small to be described in the news, will experience a similar upswing. By the same rationale, the events may even include political and environmental happenings affecting the company's stock.

The text analysis engine 102 extracts and derives events from the textual documents using text mining techniques. The text mining techniques automatically identify and extract entities such as company names, events such as mergers and acquisitions, and dates from unstructured text such as news articles and SEC filings.

In a preferred embodiment using text mining, the text analysis engine 102 analyzes textual documents 116 and automatically extracts structured information, e.g. company names, product names, people names, technologies, locations, etc. In the context of stock prices, the text mining engine 102 preferably identifies events of financial significance such as mergers and entities such as companies. For example, the text analysis engine 102 can analyze a document comprising the following text:

Xsis Inc., a leading manufacturer of video devices, has announced the acquisition of Ybib, the bankrupt Korean hardware manufacturer. "This acquisition will allow us to expand into the south-east Asia market," says Joe von Garten, chief executive of Xsis.

From this text, the text analysis engine 102 can extract structured information indicating that:

1. Xsis is a name of a company
2. Ybib is a name of a company
3. Joe von Garten is a name of a person
4. Xsis acquired Ybib
5. Ybib is bankrupt
6. Joe von Garten is CEO of Xsis Extracted information is preferably classified into entities, and facts. Entities preferably comprise a single word or sequence of words which represents an entity of a specific type, e.g. company name, person name, product name, technology, etc. Items 1-3 above are of this type. Facts preferably comprise specific information pertaining to the entities, e.g. company X acquiring company Y; person A being CEO of company X; or the fact that company Y is bankrupt. Items 4-6 above are of this type. Many facts provide information on relationships between entities (e.g. employment, acquisition, etc.).

In a preferred embodiment, text analysis engine 102 performs information extraction by performing a syntactic and semantic analysis of the text utilizing structure-driven rules. For example, item 4 is an example of a binary relationship between companies, labeled "ACQUIRED." For the ACQUIRED relationship, text analysis engine 102 searches for a Subject-Verb-Object structure, requiring the Subject and Object to be company entities and the Verb to be tensed so that its head belongs to an Acquisition lexicon comprising words describing the action of acquiring (e.g. acquire, purchase). Associated constraints require, for example, different Subject and Object (i.e. two different companies—a semantic constraint) and verb-preposition agreement (syntactic constraint).

The implementation of the Structure-Driven processing is based on a general multi-level Natural Language Processing (NLP) system comprising six layers. Layer 0 comprises a Part of Speech (POS) Tagger that assigns POS tags (e.g. noun, proper noun, verb, adjective, adverb, preposition) to each word. Layer 1 comprises a Noun Phrase and Verb Phrase Grouper that groups together the head noun with its left modifiers (for example: "massive payment agreement") and, for verbs, chunking a main verb with its auxiliaries (like in "has been acquired" or "is already being incorporated").

Layer 2 comprises a Verb and Noun Pattern Extractor: The Extractor extracts larger verb and noun phrases, on the basis of semantic requirements. For example: "said Monday it has acquired" or "announced plans to acquire". In general, this mechanism matches verbs and nouns with their complements, as specified in associated sub-categorization properties. Layer 2 is semantically-oriented: it keeps track of the semantic features of a pattern, as expressed by various elements such as adverbs, tense and voice of the verb group and certain syntactic structures. This way, the system can identify complex patterns that still express a basic relation given by the right-most element of the pattern. For example, in "SignalSoft has expanded its application portfolio with the acquisition of mobilePosition(R)" is a verb pattern based on the keyword "acquisition", that is used to extract acquirer-acquired relations.

Layer 3 comprises a Named Entity Recognizer that recognizes companies, persons, products, and so forth. Layer 4 comprises a Nominal Expression Extractor that matches nominal phrases that contain entities as arguments, such as "Microsoft's acquisition of Visio", or "The acquisition by Microsoft of Visio". Layer 5 comprises a Template ("Event") Extractor that provides rule-based extraction of patterns at a full sentence or phrase level.

For example, the full sentence "Microsoft announced Monday it has acquired Visio" is matched using the Verb Pattern of Layer 2 "announced Monday it has acquired". This layer uses a lexicon of keywords, nouns and verbs that are relevant to the specific template. (For example, in the case of the Acquisition template, verbs such as "acquire", "buy", "bid"). This layer also includes extraction of other elements that are needed to shallow-parse sentences and additional information regarding a template (such as adverbial phrases, appositive clauses, dates, and so forth.).

The multi-layer text analysis system is preferably implemented using DIAL, a declarative, rule-based language, designed specifically for information extraction and available from ClearForest Corporation. DIAL is described in Feldman R., Liberzon Y, Rosenfeld B., Schler J. and Stoppi J., 2000. "A Framework for Specifying Explicit Bias for Revision of Approximate Information Extraction Rules," *KDD* 2000: 189-199, which is incorporated herein in its entirety by reference.

DIAL provides operations required for performing information extraction: tokenization, zoning (recognizing paragraph and sentence limit), and morphological and lexical processing, parsing and domain semantics. DIAL has built-in modules that perform the general tasks of tokenization and part-of-speech tagging. In addition, text analysis engine 102 comprises a general library of rules that perform Noun Phrase and Verb Phrase grouping and separate libraries for recognizing relevant Entities, such as "companies" or "persons".

A DIAL "program" is phrased as a logic program—a Rule Book. A Rule Book comprises a conjunction of Definite clauses ("rules") $C_1$: $H_1 \leftarrow B_1$, where $C_1$ is a clause label, $H_1$ ("the head") is a literal and $B_1 = (B_{11}, B_{12}...) = (P_1, N_1)$ (the clause's body), where $P_i = (p_{11})$ is a series of Pattern Matching Elements and $N_1 = \{n_{11}\}$ is a set of constraints operating on $P_1$.

The clause $C_1$: $H_1 \leftarrow B_1$ represents the assertion that $H_1$ is implied (or, in our context, that an instance of $H_1$ is defined) by the conjunction of the literals in $P_1$ while satisfying all the constraints in $N_1$.

Typically, $H_1$ is a template (event) sought by the information extraction process (such as Acquisition or Person-Left-Position). As a result, whenever the series of pattern matching elements $P_1$ is found in the text and the constraints set $N_1$ is fulfilled, the program deduces that the template $H_1$ occurs in that text fragment.

A Pattern Matching Element $p_{ii}$ may be for example an explicit token (String) found in the text—e.g. "announces", or a word class element such as a phrase from a predefined set of phrases that share a common semantic function—e.g. the word class wcResignation comprising the words: "resignation" "retirement" and "departure", or a predicate call—e.g. Company(C).

A constraint $n_{11}$ may be used for carrying out Boolean checks on relevant segments of texts matched by the pattern matching elements. A constraint is typically implemented by using a suitable Boolean function, for example InWC, which returns TRUE if the tested text segment is a member of the tested word class. For example, verify(InWC(P, @wcAnnounce)) means that the P pattern matching element must be a member of the word class wcAnnounce.

The following is a simplified example of a DIAL rule for extracting a common Person-Left-Position template:

PersonLeftPosition(Person_Name, Position, Company_Name):-
Company(Company_Name)
Verb_Group(V_Stem ,V_Tense ,V_Modifiers)
Noun_Group(N_Determiner,N_Head,N_Stem,N_Modifiers)
"of"
Person(Person_Name)
["as"]
wcCompanyPositions
verify(InWC(V_Stem,@wcAnnounce))
verify(InWC(N_Stem,@wcResignation));

The rule above corresponds to a common pattern in financial news announcing resignation or retirement, as in: "*International Isotopes Inc Announces the Resignation of Dr. David Camp As President and CEO*".

The example DIAL code above causes the following actions: extraction of a *Person-Left-Position*template from this text segment if a Company was identified, followed by a Verb Group whose stem is included in the wcAnnounce word class (that includes verb such as "announce" or "report "), followed by a Noun Group (that may include a determiner such as "the") whose head is a member of the word class wcResignation (This word class includes the terms "resignation", "retirement" and "departure"), followed by the word "of", followed by a person name, followed by the optional word "as" and a term from wcCompanyPosition, a word class that includes common positions of executives such as "President", "CEO, "CFO" and so forth. The Company and Person predicates are implemented in a separate module that is executed before the Person-Left-Position module.

The text analysis engine 102 also generates a description of extracted events. The description can be an actual snippet of a text from which the event is derived, or it can be a synthetic sentence summarizing the event.

The knowledge base 104 receives and stores events and associated information from the text analysis engine 102. It stores the events and associated information for the application server 108 to access. Each event is linked to various event types, to various companies and organizations that will be investigated, and to the time of occurrence of the event. Also, each event is linked to the textual document from which the event was extracted and to a paragraph of the textual document that is pertinent to the event, and a snippet of the text that is pertinent to the event or a synthetic sentence about the event.

The quantitative data repository 106 provides quantitative time-series data to the application server 108. The quantitative data comprises numerical data, such as stock prices, stock indices (e.g., NASDAQ, SAP), weather forecasts, and actuarial data. Each of the quantitative data corresponds to a time or time interval such that the quantitative data forms a time series.

The quantitative data is provided from a data source 110. The data source 110 is an external source, such as a specific data bank accessible via the Internet, where desired quantitative data is available. For example, when the desired quantitative data is stock prices, the data source 110 may be the stock data bank at Interactive Data Corporation, Inc.

In a preferred embodiment, the quantitative data repository 106 is a data base resident within the correlating system 100. It stores quantitative data obtained from the data source 110. In this embodiment, the operation of the correlating system 100 may be independent from the data source 110 if the desired quantitative data has already been obtained and stored in the quantitative data repository 106.

In an alternative preferred embodiment, the quantitative data repository 106 is a connection which fetches the desired quantitative data in real-time from the data source 110. The connection can be a wired or wireless network connection via, for example, HyperText Transport Protocol (HTTP).

The application server 108 is configured to aggregate and correlate the events and associated information from the knowledge base 104 and the quantitative data from the quantitative data repository 106. It is configured to interact with the knowledge base 104 and the quantitative data repository 106 and to construct a data structure, preferably in the form of an EXtensible Markup Language (XML) file or HyperText Markup Language (HTML) file. It is also configured to interact with the visualization client 112 for receiving requests and transmitting the data structure. The data structure contains the combined information of the events and associated information and the quantitative data. The operation of the application server 108 will be disclosed in detail below in connection with FIGS. 2 and 5.

The visualization client 112 receives inputs from the user 118, interacts with the application server 108, and displays information obtained from the application server 108. It is preferably a computer with graphical capabilities. The operation of the visualization client 112 will be disclosed in detail below in connection with FIGS. 3, 4, and 5.

Figure 2:
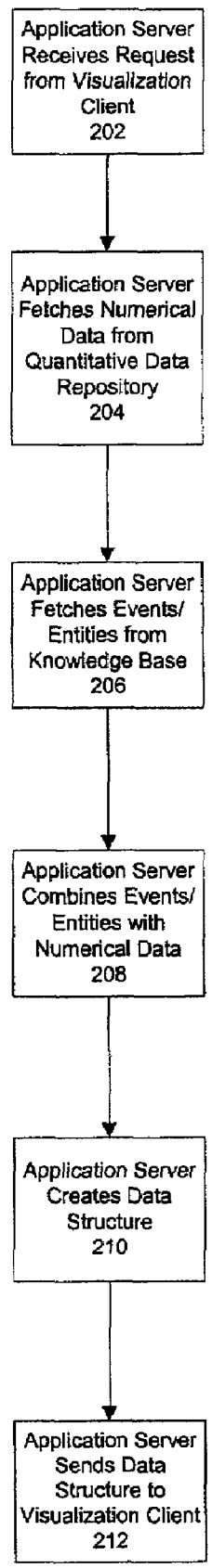
FIG. 2 is a flow chart showing the correlating process of a correlating system according to one embodiment of the present invention.

FIG. 2 is a flow chart showing the correlating process of the application server 108. At step 202, the application server 108 receives a request from the visualization client 118. As will be discussed in detail below in connection to FIGS. 3 and 4, the request contains an indication of a time period (or date range) and a parameter. The parameter indicates a time series. For example, the parameter may be an indication of which company's stock price to review. Preferably, the request also contains an indication of a type or types of events to review. For example, the request may indicate only business activities such as mergers and acquisitions of a company for review, thus excluding business activities such as new product introductions or officer resignations. Similarly, the request may indicate only business activities of partners of the company for review, thus excluding business activities of competitors of the company.

At step 204, the application server 108 fetches time series data from the quantitative data repository 106 in response to the request. For example, if the parameter contained in the request indicates a stock price, the application server 108 fetches the prices of the indicated stock during the indicated time period. If the quantitative data repository 106 is a database, the indicated time series data is fetched directly from the data base. Otherwise, if the quantitative data repository 106 is a connection to the data source 110, the indicated time series data is fetched from the data source 110.

At step 206, the application server 108 fetches event data from the knowledge base 104. The event are data fetched in accordance the request, and are related to the specified type parameter and time period. For example, for a specified stock price within a specified time period and a specified event type of company merger, the application server 108 fetches merger events in the time period for the company that issued the stock.

The events may also be specified to include business activities of entities other than the company that issued the stock. Selections of the event and entity to fetch may also be determined based on links between events and entities in the taxonomy. For example, when a company is being investigated, events about classes of companies of which the company under investigation is a member (e.g., industry sector) can be included.

At step 208, the application server 108 combines the fetched events with the fetched time series data. For example, the application server 108 may combine business activities of the company that issues the specified stock with the stock prices within the time period, with each activity correlated with the price of the stock on the date the activity occurred. Preferably, the application server 108 eliminates duplicates of events derived from different textual documents.

At step 210, the application server 108 creates a data structure, preferably in the form of a XML file, consisting of the combined information. Thereafter, at step 212, the application server 108 transmits the data structure to the visualization client 112.

Referring back to FIG. 1, the visualization client 112 comprises a user interface (not shown) that allows a selection of events to be displayed. Events can be selected individually by the user 118 for a more granular investigation, or they can be selected in groups, according to their type. Also, subsequent interaction can be made between the user 118 and the application server 108 through the visualization client 112.

Figure 3A:
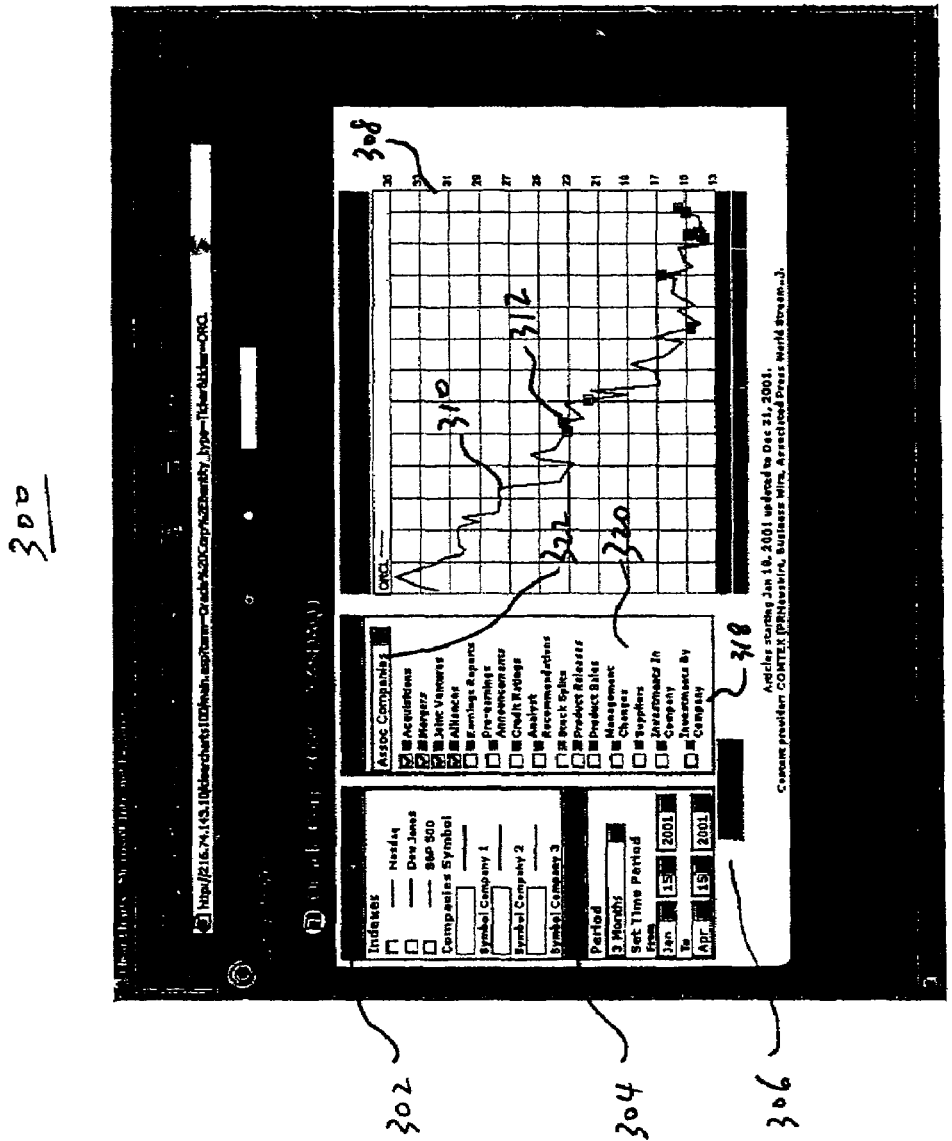
FIGS. 3a-d show an interface of a correlating system according to one embodiment of the present invention.

FIG. 3a shows a preferred embodiment of a display enabled by the user interface. This embodiment is an application of the correlating system 100 in the context of stock prices. As shown in FIG. 3a, the display 300 comprises a "compare to" panel 302, a time period panel 304, an event types panel 318, a draw button 306, and a graph panel 308. The display 300 is generated based on a user's input comprising the name of a company in a prior display (not shown). Preferably, the input also comprises a time period. Otherwise, if the input does not comprise a time period, a default time period (preferably 1 year) is used, ending at the current time.

The graph panel 308 comprises a plot 310, showing the time series of the price of the stock issued by the company for the time period. The time period panel 304 is configured for the user to change the time period and granularity (e.g., daily, weekly, and monthly) of the graph panel 308. The event types panel 318 comprises a list 320, providing a variety of business activities for the user to select. For financial applications, event types preferably include acquisitions, mergers, joint ventures, alliances, earnings reports, pre-earnings announcements, credit ratings, analyst recommendations, stock splits, product releases, product sales, management changes, suppliers, investments in a company, and investments by a company. The selected business activities will be superimposed, as event icons 312, on the time-series of the company's stock price. The business activities listed in list 320 are associated with different color legends, corresponding to the colors of the event icons 312, for ease of identification.

The "compare to" panel 302 is configured for the user to select stock indices or stock prices of other entities to be also plotted in the graph panel 308 for comparison. The event types panel 318 further comprises an entity selection 322. When the user selects an entity in the "compare to" panel 302, the entity selection 322 indicates the name of the entity, and business activities selected from the list 320 are associated with the selected entity and superimposed on the selected entity's stock price time series in the graph panel 308 when next redrawn The draw button 306 is used to redraw graph panel 308. When it is desired to make a change to the plot in the graph panel 308 and appropriate selections have been made in fields such as the time period panel 306 and events types panel 318, the activation of the draw button 306 causes a new plot to be displayed in the graph panel 308.

Figure 3B:
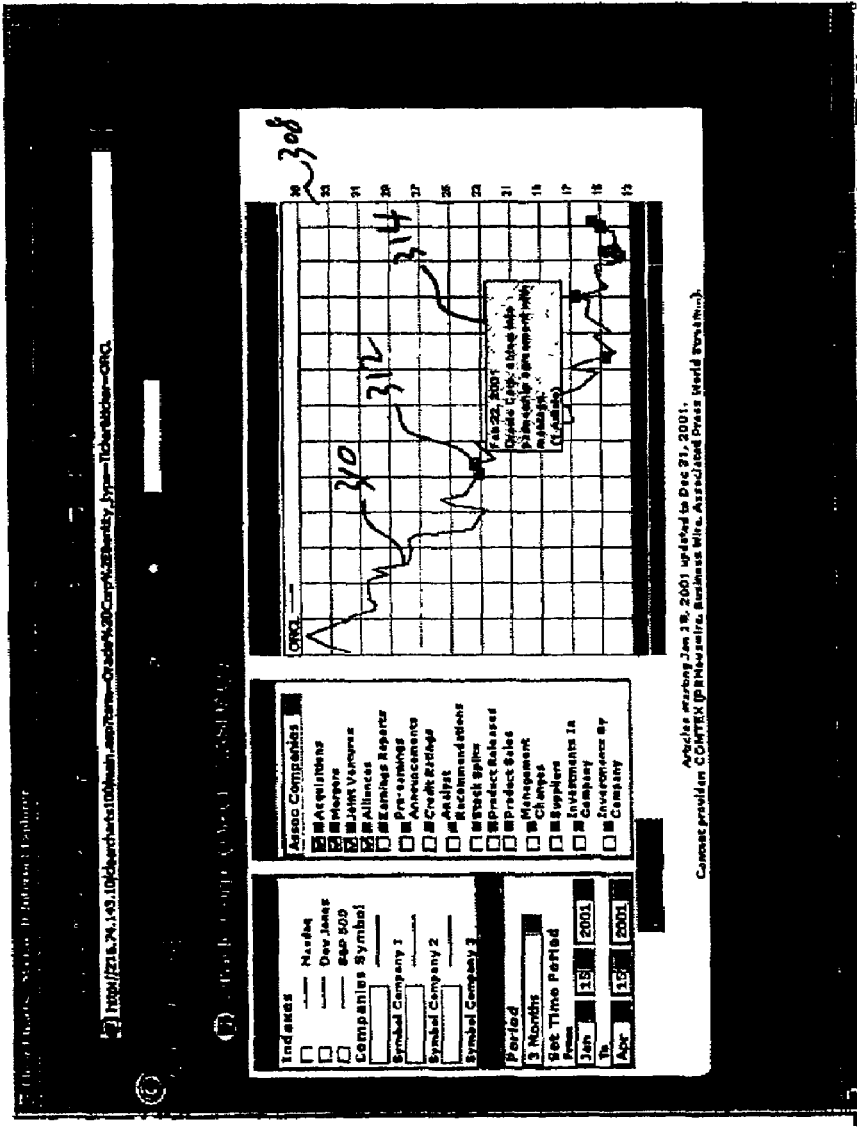

When a cursor or a mouse-pointer is placed on an event icon 312, a pop-up panel 314 will appear, showing a brief description of the event associated with the event icon, as shown in FIG. 3b. The description can be an actual snippet of a text from the textual document from which the event is derived, or it can be a synthetic sentence that the correlating system generated. When there are two or more selected events on a same date, the corresponding event icons are overlapped. When the cursor is placed on the overlapped icons, the icons separate extending in the vertical direction. In this case, a pop-up panel will appear if the cursor is placed on an individual icon.

Figure 3C:
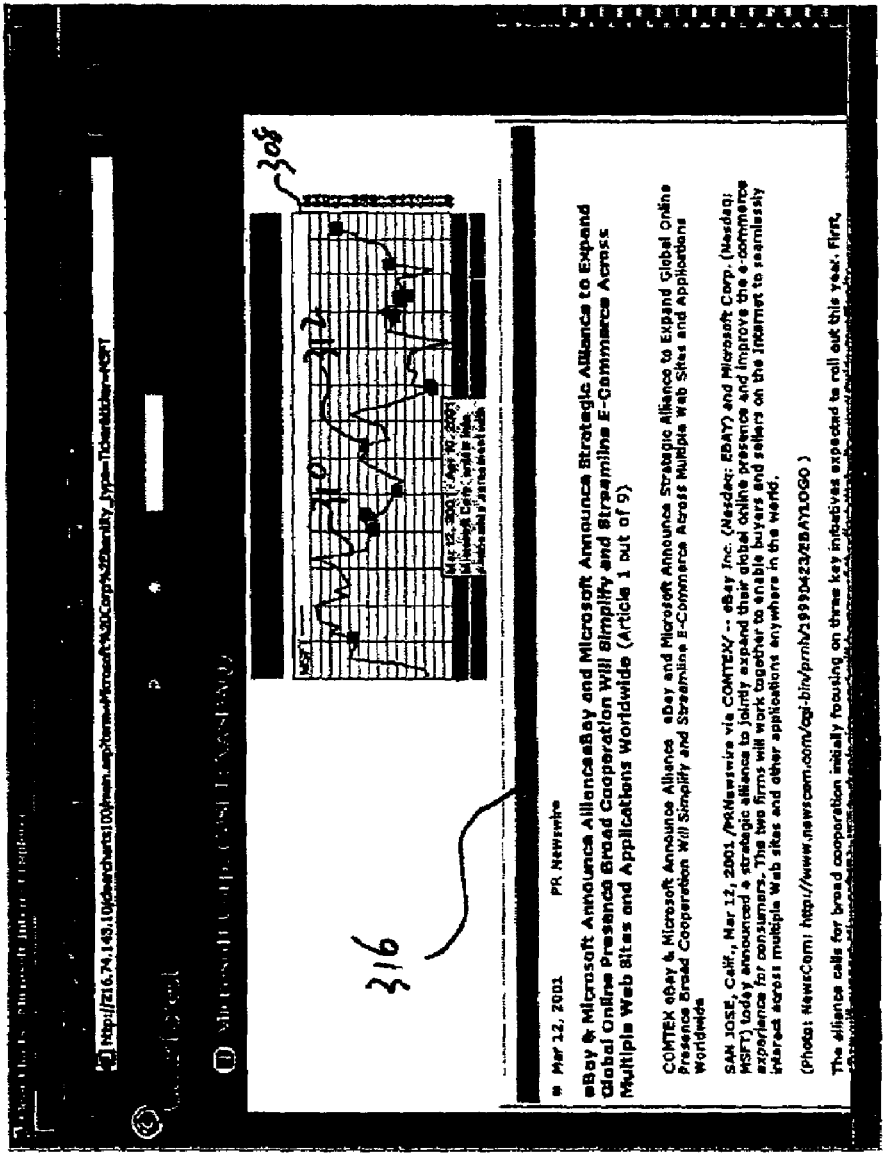

When an event icon is clicked, a list of descriptions will appear in a document panel 316, as shown in FIG. 3c. The document panel 316 is preferably an extendable panel, which does not appear before an event icon is click and disappears when viewing of the list of descriptions is finished, as indicated by the user. Each description describes an event associated with the icon and is preferably in the form of a snippet or a paragraph of the textual document from which the event is derived. When a description is clicked, the associated textual document is displayed in full. Preferably, the textual document is displayed below the description in the document panel 316. Also preferably, the textual document is displayed with the associated description highlighted in the body of the textual document.

Also, when the user clicks on a point of the plot 310 where there is no event icon, a list of descriptions appears in the document panel 316. This list contains descriptions of all the events that occurred on the date corresponding to the point. A click on a description in the list will bring up the corresponding textual document in full.

Figure 3D:
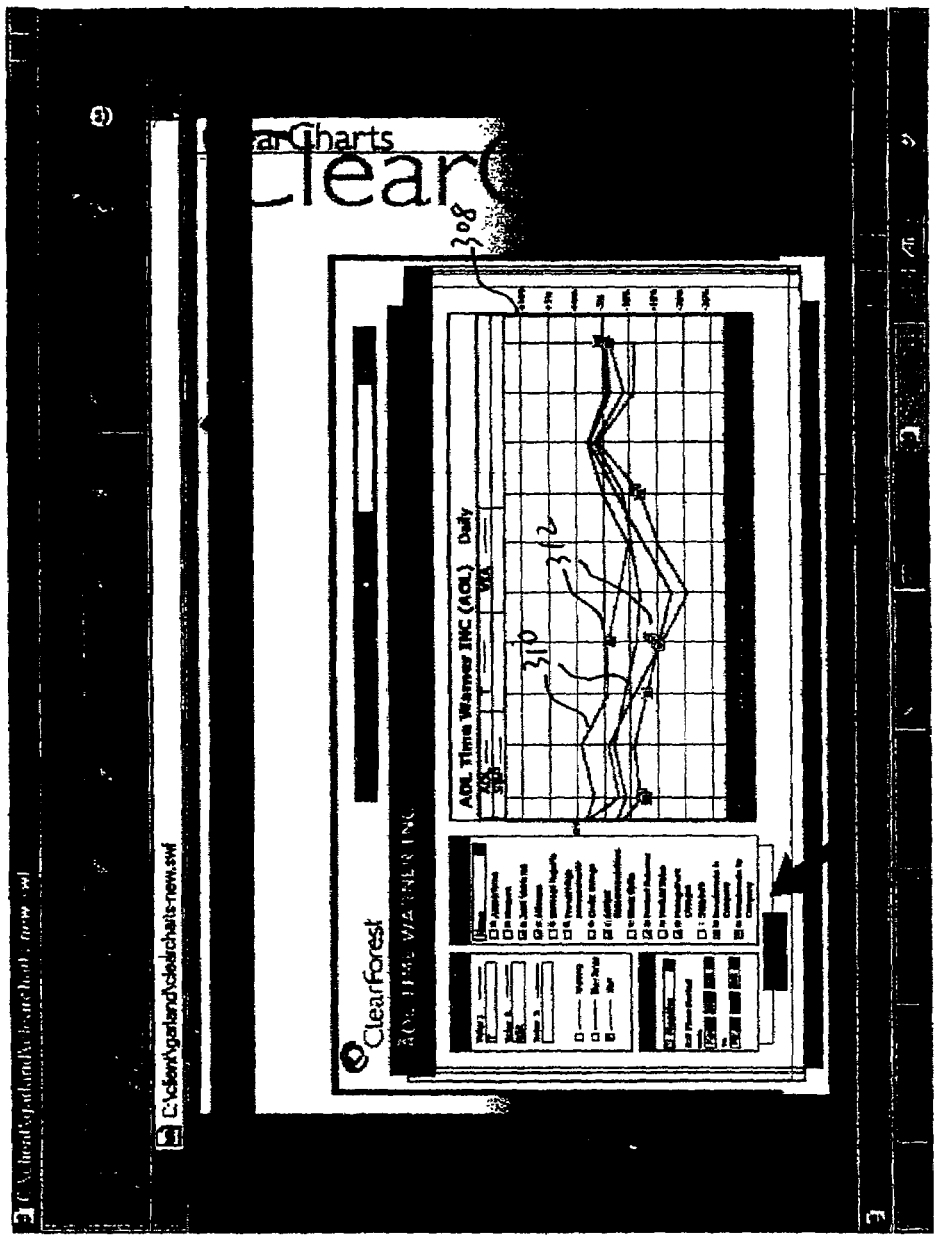

Referring back to FIG. 3a, after stock indices and entities are selected in the "compare to" panel 302, with corresponding business activity events selected in the event types 318, for comparison, an activation of the draw button 306 will cause the selected indices and the stock prices of the selected entities to be plotted in the graph panel 308, as shown in FIG. 3d. The business activity events of the selected entities will be presented as icons superimposed on the corresponding stock price time-series of the entities, respectively. All the event icons are active, and can be activated for brief pop-up descriptions, descriptions, and textual documents associated with events, as described above. Similarly, points on the plots where there is no icon can be selected for descriptions and textual document of events.

Figure 4:
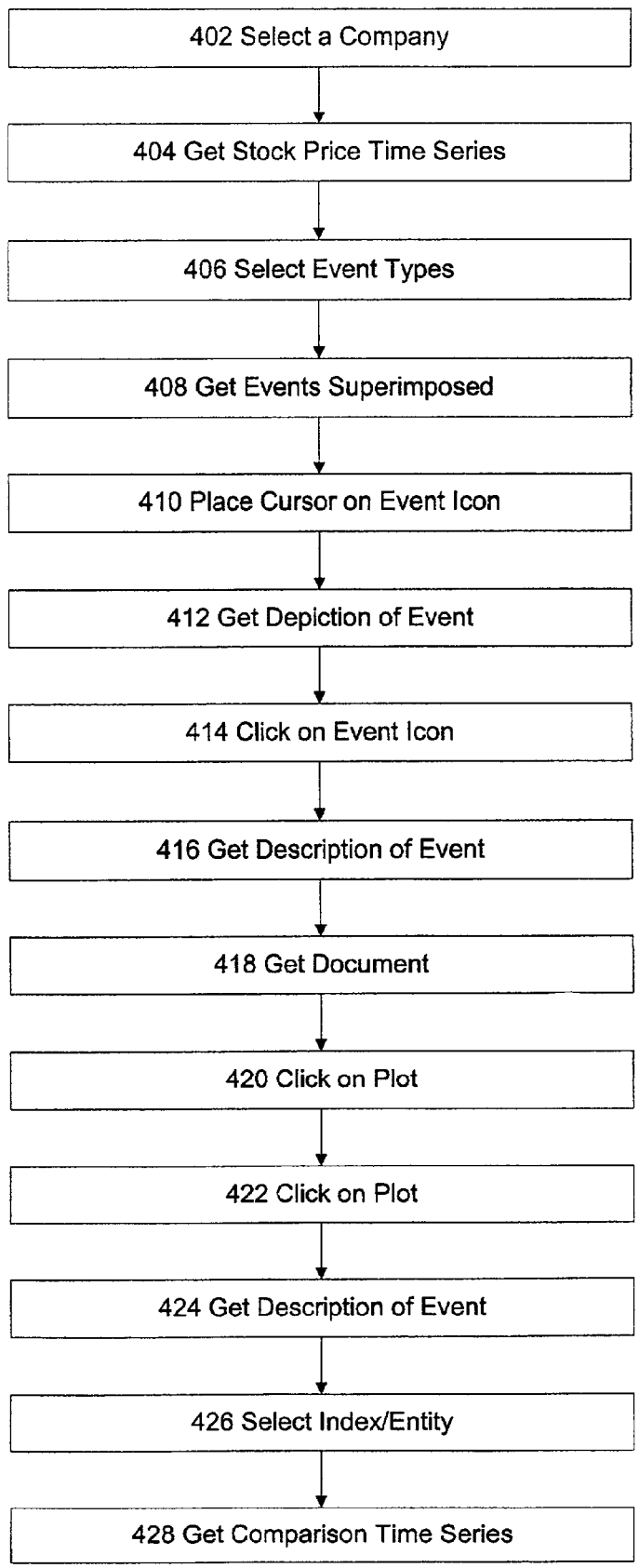
FIG. 4 is a flow chart showing the interaction between a user and a correlating system according to one embodiment of the present invention.

FIG. 4 shows a flow chart showing an example interaction between the user 118, the application server 108, and the visualization client 112. At step 402, the user 118 enters or selects the name of a company and the visualization client 112 sends the company name to the application server 108.

At step 404, the application server 108 fetches from the quantitative data repository 106 the company's stock price within a time period, which preferably ends at the current time. The application server 108 then transmits the stock price time series to the visualization client 112. The visualization client 112 displays the stock price time series.

At step 406, the user 118 selects event types associated with the company and the visualization client 112 sends the event types to the application server 108.

At step 408, the application server 108 fetches from the knowledge base 104 events concerning the company in accordance with the event types and within the time period. The application server 108 combines the events with the stock price, creates a data structure containing the combination, and transmits the data structure to the visualization client 112. The visualization client 112 displays the data structure with the events superimposed in the form of icons on the stock price time series.

At step 410, the user 118 places a cursor on an icon. The visualization client 112 identifies the event associated with the icon and sends a request for a brief description to the application server 108.

At step 412, the application server 108 fetches from the knowledge base 104 the brief description of the event and transmits it to the visualization client 112. The visualization client 112 then displays the brief description.

At step 414, the user 118 clicks on an icon. The visualization client 112 identifies the event associated with the icon and sends a request for descriptions to the application server 108.

At step 416, the application server 108 fetches from the knowledge base 104 the descriptions of the event and transmits them to the visualization client 112. The visualization client 112 then lists the descriptions.

At step 418, the user 118 clicks on a description. The visualization client 112 identifies the textual document associated with the description and sends a request for the textual document to the application server 108.

At step 420, the application server 108 fetches from the knowledge base 104 the textual document and transmits it to the visualization client 112. The visualization client 112 then displays the textual document.

At step 422, the user 118 clicks on a point on the stock price time-series. The visualization client 112 identifies the date associated with the point and sends a request for descriptions of all events associated with the company whose stock price is represented by the time series which occurred on that date to the application server 108.

At step 424, the application server 108 fetches from the knowledge base 104 the descriptions of all events associated with the company whose stock price is represented by the time series which occurred on that date and transmits them to the visualization client 112. The visualization client 112 then lists the descriptions.

At step 426, the user 118 selects stock indices and/or entities for another company. The user 118 also selects event types associated with the selected company, if any. The visualization client 112 sends the selections to the application server 108.

At step 428, the application server 108 fetches from the quantitative data repository 106 the other company's stock prices. Also, the application server 108 fetches from the knowledge base 104 events associated with the event types associated with the other company. The application server 108 combines the events with the stock prices, creates a data structure containing the combination, and transmits the data structure and the stock indices to the visualization client 112. The visualization client 112 displays the other company's stock price time series, with the events associated with each company superimposed on the stock price time series of the company.

Figure 5:
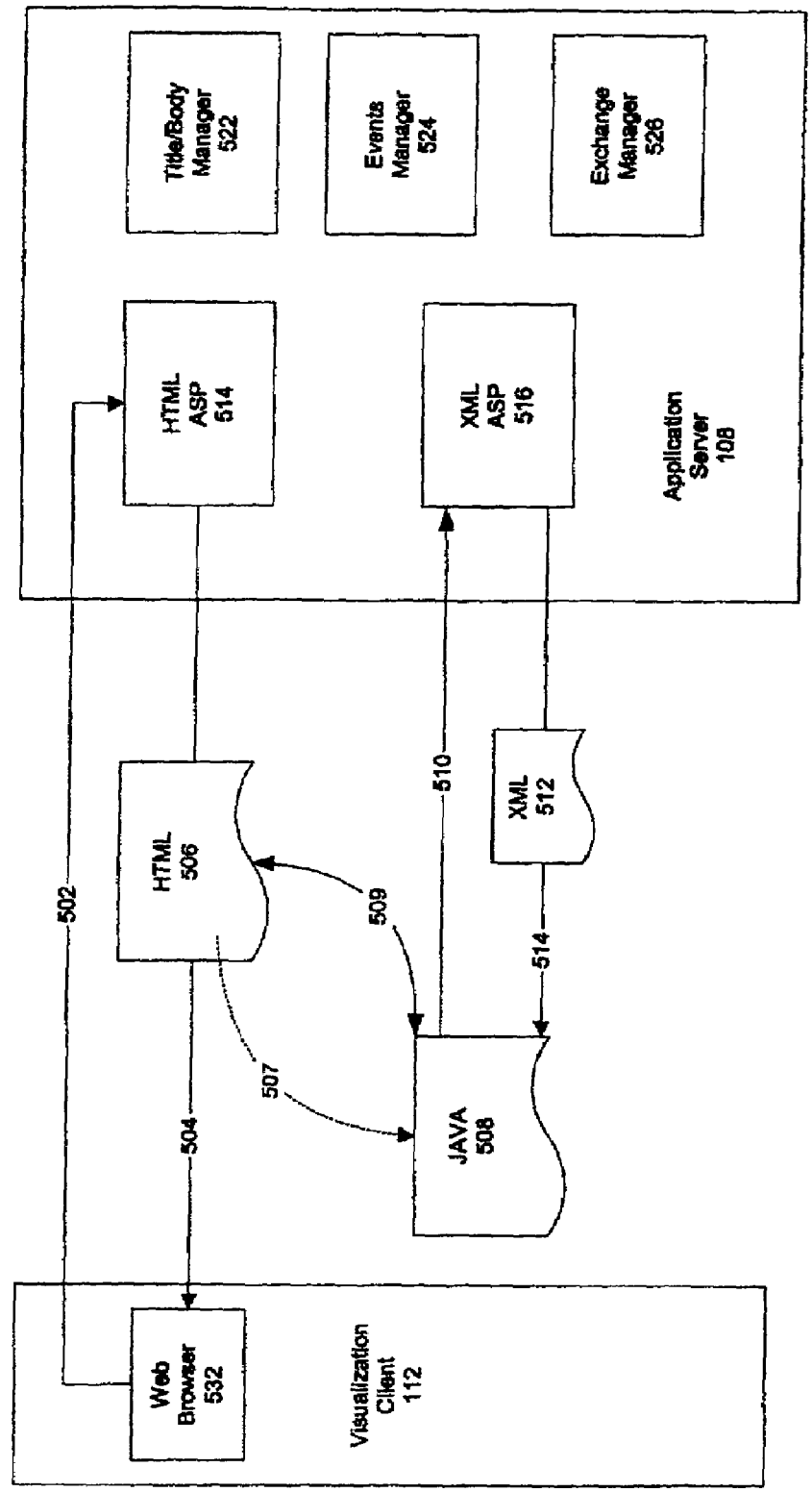
FIG. 5 is a schematic illustration showing the architecture of the application server and its interaction with the visualization client according to one embodiment of the present invention.

FIG. 5 is a schematic illustration showing the architecture of application server 108 according to one embodiment of the present invention. It also shows the interaction between the application server 108 and the visualization client 112 of the embodiment. This interaction leads to the drawing and updating of a chart showing desired information, such as a time series of stock prices with superimposed events, such as acquisitions and/or mergers.

As shown in FIG. 5, the visualization client 112 includes a browser 532 that communicates with application server 108 preferably via HyperText Transport Protocol (HTTP) over TCP/IP.

In the embodiment shown in FIG. 5, the application server 108 comprises a first ASP (active server page) object 514 for serving HTML, and a second ASP 516 object for serving other XML, a titles/bodies manager 522, an events manager 524, and an exchange manager 526. Titles/bodies manager 522, events manager 524, and exchange manager 526 are business logic components that interact with one or more data sources (not shown), such as databases. These business logic components are preferably dynamic link library (DLL) component object model (COM) objects.

The visualization client browser 532 sends an HTTP request to the HTML ASP object 514, requesting a page such as a time-series plot for Oracle as shown in FIG. 3a. In this example, the HTTP request specifies the ticker for Oracle, and preferably also specifies a time period or duration and at a specified time frequency. The duration may be expressed as beginning and ending dates and the frequency may be, for example, weekly or daily. The HTML ASP object 514 queries the Exchange Manager 526 for additional descriptive information such as the name of the company corresponding to the ticker, generates an HTML page 506, and transmits the page to the visualization client browser via HTTP 504.

As indicated by dashed line 507, the HTML page 506 preferably includes links to one or more JAVA applets 508 for drawing and interacting with the user, and for requesting data from the XML ASP object 516. The JAVA applets also interact with JavaScript logic included in the HTML page 506, as indicated by line 509.

The visualization client browser 532 receives and interprets the HTML page 506 causing the browser to retrieve and execute the one or more JAVA applets 508. Upon loading and executing, the one or more JAVA applets send a request 510 to the XML ASP object 516 for the time-series data specified by the HTTP request 502. The XML ASP object 516 then queries the Exchange Manager component 526, which returns a data set to the XML ASP object containing the requested time-series data. The XML ASP object then translates the data set into XML and sends 514 the XML 512 to the one or more JAVA applets 508. The request 510 to and response 514 from the XML ASP object are preferably via HTTP.

The one or more JAVA applets 508 preferably include an XML parser, and parse the XML 512 data structure received from the XML ASP object 516, and plot the data as shown for example in FIG. 3a. The JAVA applets 508 are configured to interact with the HTML rendered by the browser via JavaScript. When the user selects various options in the Compare To 302, Time Period 304, and Event Types 320 form sections, and then selects the Draw button 318, the user's selections are passed to the JAVA applets 508. The JAVA applets 508 then combine the user selection data with the ticker selection from the original request 502, and, when signaled that the draw button 306 has been selected, sends a request for additional data to be plotted to the XML ASP object 516. The XML ASP object 516 uses the received data to query the Events Manager component 524 for events of the selected types during the indicated time period. The XML ASP object 516 also queries the Exchange Manager component 526 for time-series data for any additional time-series selected in the Compare To section 302, and optionally, the time-series data for the ticker selection from the original request 502. When the ASP object receives the requested data sets from the Events Manager component 524 and the Exchange Manager component 526, the XML ASP object correlates the data sets and generates an XML data structure including the time-series data and associated events and sends the XML data structure 512 to the JAVA applets 508. When the JAVA applets 508 receive the XML data structure 512, the JAVA applets parse the data and plot the events and time-series data as shown in FIG. 3d.

In a preferred embodiment according to the present invention, the methods that cause Java applets 508 to obtain data of companies and to add information to a graph are preferably public. These methods include: (1) NewCompany for selecting a company with parameters for ticker, index, exchange, beginning and ending dates, and frequency, (2) AddCompany for adding a company with parameters for ticker, index, exchange, beginning and ending dates, and frequency, (3) AddIndex for adding an index with parameters for index and exchange, (4) SetEvents for setting events using a Vector of Events type, and (5) UpdateChart for updating a graph or chart with parameters for beginning and ending dates and frequency, causing the applets to redraw the plot. These methods are called by Javascript activated by the various form elements depicted in FIG. 5a.

The Exchange Manager 518 translates tickers to company names and vice versa, and provides time-series data, such as stock closing prices. Preferably, the Exchange Manager 518 communicates with a data provider residing within the correlating system, such as the quantitative data depository 106 shown in FIG. 1. Alternatively, one or more data providers are accessed via external data link, such as the data source 110 shown in FIG. 1. Preferably, Exchange Manager communicates with its data providers using standard database protocols such as ODBC. The Exchange Manager 526 also preferably obtains information on business days in different calendars, and accounts for the time differences between different parts of the world.

The Events Manager 524 supports the retrieval of events of a company in response to the specification of a set of event types and a time period. Using supplied event types, associated entity and time interval and frequency information, the Events Manager 524 queries an event data source, such as knowledge base 104 shown in FIG. 1.

Title/Body manager 522 supports the retrieval of the titles and bodies of documents associated with a given event. It communicates with a data provider or source, such as knowledge base 104, to perform the retrieval. For example, in response to a request of GetTitles with specifications regarding ticker, exchange, terms, beginning and ending dates, the titles/bodies manager 522 will output information describing the documents from which events were derived such as DocId, Date, Title, and Source. Here, "DocID" refers to the identification of the article and "source" refers to the source of the article.

In addition to retrieving the titles of the documents associated with a given event, the Title/Body manager 522 also retrieves and formats the bodies of the documents associated with the given event. In formatting the bodies, the Title/Body manager 522 marks or highlights the event information and the name of the company in the bodies of the documents. For example, in response to a request of GetBody with specifications regarding article identification, event types, terms, and ticker, the titles/bodies manager 522 will output the text of the bodies of documents the event information highlighted.

While the invention has been described and illustrated herein with respect to preferred embodiments, it should be apparent that various alternatives, modifications, adaptions, and variations will be apparent to those skilled in the art and may be made utilizing the teachings of the present disclosure without departing from the scope of the invention and are intended to be within the scope of the invention as defined by the claims herein.

What is claimed is:

1. A system for correlating data with events derived from text mining comprising:
   a text analysis engine recorded in an electronic memory and configured to:
   (1) parse unstructured text using a multi-level natural language processing system, wherein said multi-level natural language processing system comprises
       a first layer configured to assign parts of speech tags to each word of the unstructured text;
       a second layer configured to group together a noun with one or more modifiers;
       a third layer configured to extract verb and noun phrases on the basis of semantic requirements;
       a fourth layer configured to recognize entities;
       a fifth layer configured to match nominal phrases that contain entities as arguments; and
       a sixth layer configured to provide rule-based extraction of patterns at a full sentence or phrase level, and
   (2) based on said parsing, automatically extract a plurality of events from the unstructured text; and
   an application server program recorded in the electronic memory and configured to:
   (1) receive data indicating a time period and a parameter, the parameter concerning an entity,
   (2) retrieve an event previously extracted automatically from the unstructured text, the event relating to the entity within the time period, and
   (3) display an indication of the event superimposed on a display representing the parameter during the time period.

2. The system of claim 1, wherein the application server program is further configured to receive an event type and the event belongs to the event type.

3. The system of claim 1, further comprising a knowledge base for storing a plurality of events previously extracted automatically from unstructured text.

4. The system of claim 1, wherein the unstructured text is a news article, a document, or a combination thereof.

5. The system of claim 1, wherein the text analysis engine is further configured to associated each of the plurality of the events with a time datum.

6. The system of claim 1, wherein the entity is a company which issues a stock and the parameter is the price of the stock.

7. The system of claim 6, wherein the event is an activity of the company, a competitor of the company, or a partner of the company.

8. The system of claim 6, wherein the event is a merger, an acquisition, a product introduction, a management change, or an earning warning.

9. The system of claim 1, wherein the application server program is further configured to correlate the parameter and the event.

10. The system of claim 1, wherein the indication of the event is an active icon and the application server program is further configured to:
    receive a request indicating an activation of the icon;
    retrieve information concerning the event upon receiving the request, the information derived from the unstructured text; and
    display the information.

11. The system of claim 1, wherein the data is time-series data.

12. A method of correlating data with events derived from text mining, comprising:
    parsing unstructured text using a multi-level natural language processing system, wherein said multi-level natural language processing system performs:
       assigning parts of speech tags to each word of the unstructured text,
       grouping together a noun with one or more modifiers,
       extracting verb and noun phases on the basis of semantic requirements,
       recognizing entities,
       matching nominal phrases that contain entities as arguments, and
       providing rule-based extraction of patterns at a full sentence or phrase level;
    based on said parsing, automatically extracting a plurality of events from the unstructured text;
    receiving data indicating a time period and a parameter, the parameter concerning an entity;
    retrieving an event previously extracted automatically from unstructured text, the event concerning the entity within the time period; and
    displaying an indication of the event superimposed on a display representing the parameter for the time period.

13. The method of claim 12, further comprising retrieving the parameter within the time period.

14. The method of claim 13, wherein the retrieving of the parameter is through a database or a connection to an external source.

15. The method of claim 12, further comprising receiving an event type, wherein the event belongs to the event type.

16. The method of claim 12, further comprising storing a plurality of events previously extracted automatically from unstructured text.

17. The method of claim 12, further comprising receiving unstructured text.

18. The method of claim 12, wherein the unstructured text is a news article, a document, or a combination thereof.

19. The method of claim 12, further comprising tagging each of the plurality of events with a time stamp.

20. The method of claim 12, wherein the entity is a company which issues a stock and the parameter is the price of the stock.

21. The method of claim 20, wherein the event is an activity of the company, a competitor of the company, or a partner of the company.

22. The method of claim 20, wherein the event is a merger, an acquisition, a product introduction, a management change, or an earning warning.

23. The method of claim 12, further comprising correlating the parameter and the event after retrieving the event and prior to displaying the indication of the event.

24. The method of claim 12, wherein the indication of the event is an active icon, the method further comprising:
    receiving a request indicating an activation of the icon;
    retrieving information concerning the event upon receiving the request, the information derived from the unstructured text; and
    displaying the information.

25. The method of claim 12, wherein the data is time-series data.

* * * * *